Patented Dec. 8, 1925.

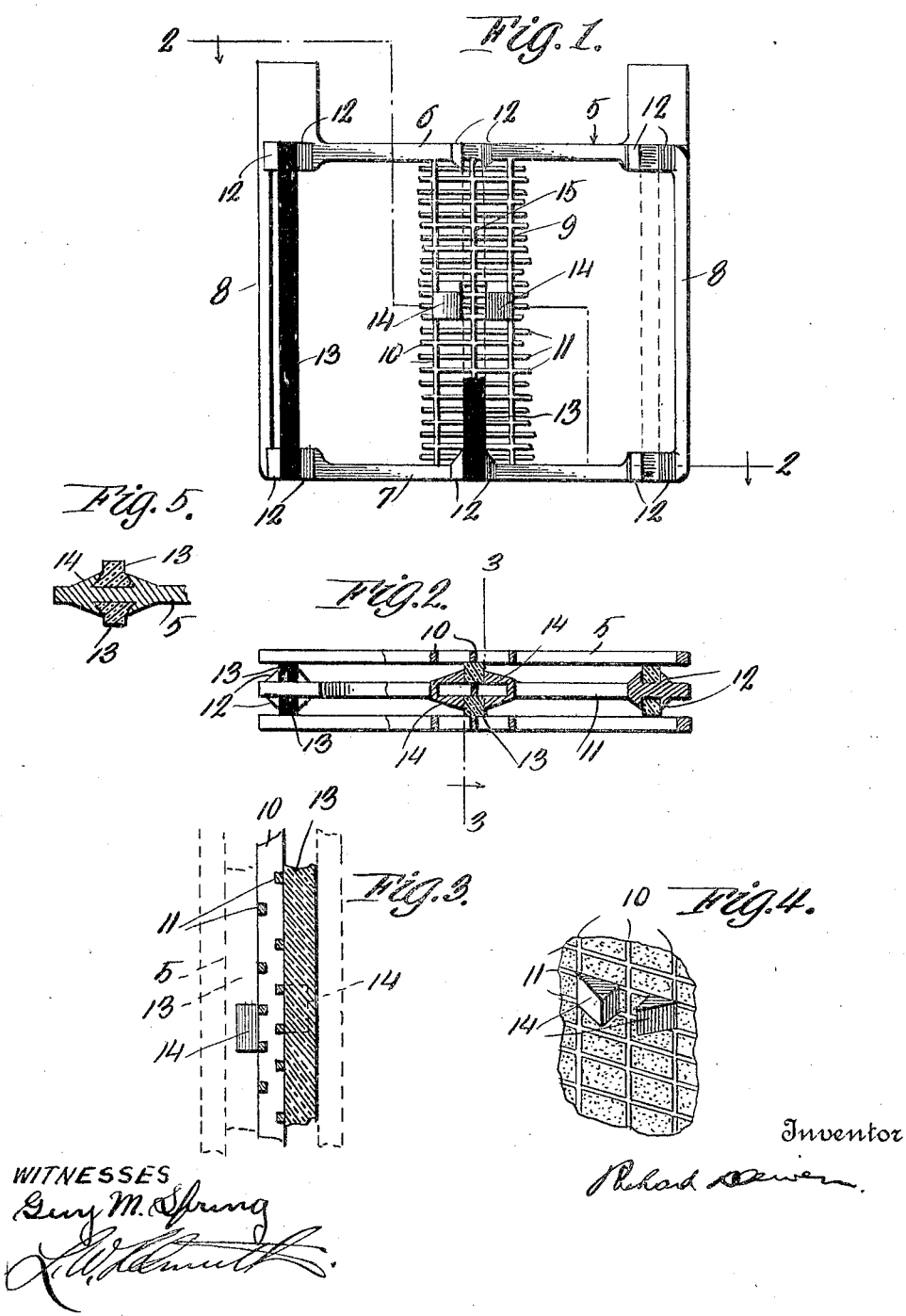

1,565,193

UNITED STATES PATENT OFFICE.

RICHARD B. OWEN, OF WASHINGTON, DISTRICT OF COLUMBIA.

STORAGE BATTERY.

Application filed December 22, 1919. Serial No. 346,556.

*To all whom it may concern:*

Be it known that I, RICHARD B. OWEN, a citizen of the United States, residing at Washington, in the District of Columbia, have invented certain new and useful Improvements in Storage Batteries, of which the following is a specification.

My invention relates to new and useful improvements in electric storage batteries, and more particularly to battery electrodes or grids, and separating and insulating means therefor, the primary object of the invention being to provide means for retaining the positive and negative plates separated and insulated and to reinforce the grids or electrodes to prevent buckling or warping thereof.

Another important object of the invention is to provide storage battery electrodes or grids with means for retaining insulating elements upon the faces thereof.

Another object of the invention is to provide a device of the above nature wherein the insulating elements are quickly and easily assembled with the electrodes or grids after the active material has been applied thereon.

A still further object of the invention is to provide a storage battery grid with means for retaining insulating elements thereon in such a manner that said elements do not occupy space ordinarily occupied by the active material, thereby permitting the grid to contain the maximum amount of active material, said means being so arranged upon the grid as to not materially decrease the active area of the battery plates.

I have shown in the accompanying drawings, an embodiment of my invention, which is at present preferred, but it is to be understood that I do not desire to limit myself to the construction, arrangement and combination of the various parts herein shown, and that I may resort to various changes in the construction, arrangement and combination of the various parts of the invention to be hereinafter described and set forth in the appended claims.

In the drawings, forming a part of this specification wherein like numerals are employed to designate like parts throughout the several views, Figure 1 is an elevation of storage battery electrodes or grids, the active material thereon being omitted, and one of the insulating separator elements being shown in position upon the grid.

Figure 2 is a transverse section of the same taken on the line 2—2 of Fig. 1.

Figure 3 is an enlarged fragmentary transverse section taken on the line 3—3 of Fig. 2, Figure 4 is a fragmentary perspective view of my improved grid or electrode with the active material applied thereon, Figure 5 is a fragmentary transverse section through a modified form of the invention.

In the accompanying drawings, the numeral 5 designates a storage battery grid consisting of the usual frame work having top and bottom margins 6 and 7 respectively, side margins 8 and a net work of bars designated in their entirety by the numeral 9. This net work consists of spaced vertical bars 10 and spaced horizontal bars 11 arranged in staggered relation upon opposite faces of the grid.

In the form herein illustrated, I have shown the invention as applied to both faces of the positive electrodes or grids but it is to be understood that the invention may be applied to one face of both positive and negative electrodes or in any other manner which proves practical and efficient. Upon opposite faces of the top margin 6 and bottom margins 7, I provide a plurality of spaced pairs of lugs or projections 12, which protrude from opposite faces of the grid. The pairs of lugs upon these margins are arranged directly opposite the lugs upon the opposite face of the respective margins in the present instance, but I desire it to be understood that the lugs or projections 12 upon the opposite faces of the grids may be arranged in any other suitable manner. The lugs on the top margin 6 are positioned in vertical alinement with the corresponding lugs on the lower margin 7, whereby they define vertical paths or channels. The lugs of each pair, are of course, spaced apart, and, as more clearly shown in Fig. 2 may taper from faces of the grid into pointed ends. As shown in the drawings, the opposing faces of each pair of lugs are arranged at approximately right angles to the grid, it being understood however, that these faces may be inclined at various angles, or formed in a different manner for engaging insulating elements so as to maintain them in their proper positions. In Fig. 5, the opposing faces of each pair of lugs converge outwardly from the grid and each insulating element is formed to correspond therewith, whereby said elements are retained in position.

Insulating elements 13, are associated with opposite faces of the grid, and in the present instance assume the form of elongated bars. Each bar is engaged by a pair of lugs 12 on the top margin and a pair of lugs on the lower margin which are in vertical alinement with the top marginal lugs, so that each bar may be arranged vertically with relation to the grid. As clearly shown in Fig. 2, opposite sides of the ends of each insulating bar are engaged by the opposing faces of each pair of lugs, the bars being of such dimensions as to protrude a substantial distance beyond the free, pointed ends of the lugs.

The lugs 14, which are formed upon the net work 9 of the grid and constitute parts of the intermediate series of lugs, are so arranged that their opposing faces are in vertical alinement with the opposing faces of the other lugs of the intermediate series. These lugs 14 are likewise formed in pairs and upon opposite faces of the grid and upon opposite sides of the central vertical bar 15 of the grid net work. The margins of the inner face of each lug may be secured or formed upon a pair of the horizontal bars 11 and one vertical bar 10 of the grid net work 9. As the lugs are spaced apart for engagement with opposite edges of an insulating bar 13, active material may be applied to the grid between the lugs upon both faces. Consequently these lugs do not occupy any material amount of the space ordinarily taken up by active material.

When the insulating bars 13 have been associated with their respective series of lugs and the plates of a group assembled, it will be seen that the relative outer faces of the bars 13 will engage the faces of adjacent battery plates whereby all of the plates will be maintained in spaced relation to one another. The insulating bars will prevent the battery plates from warping or buckling to any great extent, whereby one plate will be prevented from contacting with its adjacent plate. It will further be seen that the insulating bars 13 will be prevented from lateral movement with relation to the plates, inasmuch as opposite sides of each insulating bar will engage the opposing faces of each pair of lugs of its respective series.

Having thus fully described my invention what I claim as new and desire to secure by Letters Patent, is:—

1. A storage battery electrode including a grid thickened at predetermined points and having each thickened point channeled through to the surface of the grid to provide parallel lugs, and insulation deposited between said lugs to engage the grid surface and projecting beyond the outer extremities of the lugs.

2. An electrode for a storage battery comprising a grid having a channel, the sides of said channel being under-cut, and an insulating element conforming to and received in said channel whereby lateral movement of said insulating element relative to the plane of the grid is prevented.

3. An electrode for a storage battery comprising a grid including a net work of bars, lugs projecting laterally from the grid, certain of the lugs having margins of one face secured to certain bars of the net work, and insulating bars retained in engagement with the grid by said lugs.

In testimony whereof, I affix my signature.

RICHARD B. OWEN.